(12) United States Patent
Hutchings et al.

(10) Patent No.: US 8,420,244 B2
(45) Date of Patent: Apr. 16, 2013

(54) BATTERY PACK CONFIGURED FOR ENHANCED OPERATION IN A COLD ENVIRONMENT

(75) Inventors: James Ernest Hutchings, Roanoke, VA (US); Daniel M. Thorsen, Roanoke, VA (US); Gregory Seth Bandy, Roanoke, VA (US); John Thomas Sadler, Roanoke, VA (US); Kimberly Ann Wenger, Ponte Vedra Beach, FL (US)

(73) Assignee: Exelis, Inc., Mclean, VA (US)

( * ) Notice: Subject to any disclaimer, the term of this patent is extended or adjusted under 35 U.S.C. 154(b) by 401 days.

(21) Appl. No.: 12/780,159

(22) Filed: May 14, 2010

(65) Prior Publication Data

US 2011/0281149 A1 Nov. 17, 2011

(51) Int. Cl.
*H01M 2/08* (2006.01)
*H01M 2/10* (2006.01)

(52) U.S. Cl.
USPC ............. 429/99; 429/163; 429/175; 429/185; 429/186

(58) Field of Classification Search ................ 429/9, 71, 429/176, 198, 97, 98, 99, 100, 120, 163, 429/175, 185, 186; 606/1; 439/105
See application file for complete search history.

(56) References Cited

U.S. PATENT DOCUMENTS

| | | | | |
|---|---|---|---|---|
| 2,396,323 A | * | 3/1946 | Graf | 429/185 |
| 4,863,812 A | * | 9/1989 | Ueda et al. | 429/9 |
| 5,639,571 A | * | 6/1997 | Waters et al. | 429/71 |
| 6,558,438 B1 | * | 5/2003 | Satoh et al. | 29/623.1 |
| 6,696,196 B1 | * | 2/2004 | Eilers | 429/56 |
| 7,341,144 B2 | | 3/2008 | Tajiri et al. | |
| 2003/0149424 A1 | * | 8/2003 | Barlev et al. | 606/1 |
| 2005/0017681 A1 | | 1/2005 | Ogishima | |
| 2006/0068278 A1 | * | 3/2006 | Bloom et al. | 429/176 |

FOREIGN PATENT DOCUMENTS

| | | |
|---|---|---|
| JP | 62193057 A | 8/1987 |
| JP | 63126168 A | 5/1988 |
| JP | 7250788 A | 10/1995 |
| JP | 2000077049 A | 3/2000 |

OTHER PUBLICATIONS

Machine Translation of: JP 07250788 A, Noguchi, Oct. 3, 1995.*
European Search Report dated Sep. 5, 2011, in related European Patent Application No. 11163158.6.

* cited by examiner

*Primary Examiner* — Basia Ridley
*Assistant Examiner* — Kenneth Douyette
(74) *Attorney, Agent, or Firm* — RatnerPrestia

(57) ABSTRACT

A battery pack includes a battery compartment, a terminal plate positioned within the battery compartment for retaining at least two batteries within the battery compartment, and a cover for enclosing the battery compartment, wherein, upon enclosing the battery compartment with the cover, the cover is configured to urge an exterior surface of one of the at least two batteries against an exterior surface of another of the at least two batteries to establish both physical and thermal contact between the at least two batteries.

18 Claims, 2 Drawing Sheets

BATTERY PACK CONFIGURED FOR ENHANCED OPERATION IN A COLD ENVIRONMENT

TECHNICAL FIELD

This invention generally relates to a battery pack that is particularly suited for operating at or below −20 degrees Celsius.

BACKGROUND OF THE INVENTION

In a conventional battery pack, a multiplicity of cylindrical sealed alkaline batteries are housed in an enclosure. The terminals of the batteries are electrically connected in series or parallel with one another by a terminal plate or the like. Conventional battery packs are not ordinarily suited for operating in cold temperatures. Batteries within the battery packs are ordinarily spaced apart from each other by a distance of ¼ to ½ of the battery diameter, such that, in operation, the heat generated by one battery is not directly conducted to adjacent batteries and the heat generated by the batteries rapidly radiates outside of the battery pack. In a cold environment that is maintained at or below −20 degrees Celsius, for example, the battery voltage and, consequently, battery life, depletes rapidly as the batteries radiate thermal energy to the atmosphere.

Long battery life reduces the cost of ownership of a product and reduces maintenance requirements. In view of the foregoing, there is a continuing need to further develop and refine battery packs in the interests of battery life, thermal management, performance, weight, cost, and manufacturability.

SUMMARY OF THE INVENTION

According to one aspect of the invention, a battery pack includes a battery compartment, a terminal plate positioned within the battery compartment for retaining at least two batteries within the battery compartment, and a cover for enclosing the battery compartment, wherein, upon enclosing the battery compartment with the cover, the cover is configured to urge an exterior surface of one of the at least two batteries against an exterior surface of another of the at least two batteries to establish both physical and thermal contact between the at least two batteries.

According to another aspect of the invention, the battery pack includes the at least two batteries.

These and other aspects of the present invention will become clear from the detailed discussion hereinafter when taken into consideration with the drawings. It is to be understood that the following discussion is intended merely to illustrate the preferred embodiment of the present invention. However, the present invention is not limited to the illustrated embodiment, but is limited solely by the claims appended to this specification.

BRIEF DESCRIPTION OF THE FIGURES

The invention is best understood from the following detailed description when read in connection with the accompanying drawing. It is emphasized that, according to common practice, the various features of the drawing are not to scale. Included in the drawing are the following figures.

DETAILED DESCRIPTION OF THE INVENTION

Figure 1:
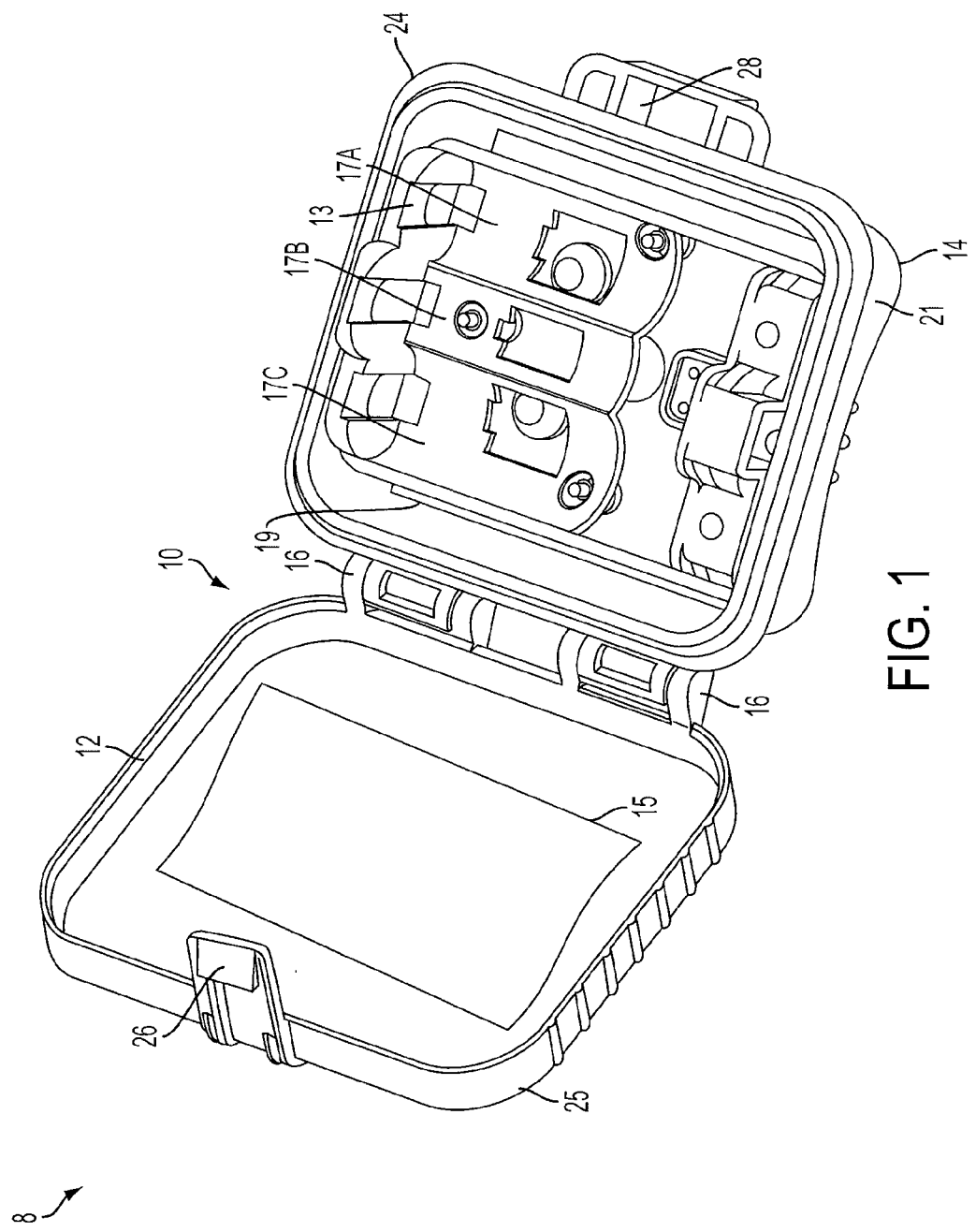
FIG. 1 depicts a perspective view of an empty battery pack rotated to an open position (batteries omitted), according to one exemplary embodiment of the invention.

Referring generally to the figures, and according to one aspect of the invention, a battery pack 8 includes a battery compartment 11, a terminal plate 13 positioned within the battery compartment 11 for retaining at least two batteries 20 within the battery compartment 11, and a cover 12 for enclosing the battery compartment 11, wherein, upon enclosing the battery compartment 11 with the cover 12, the cover 12 is configured to urge an exterior surface of one of the at least two batteries 20 against an exterior surface of another of the at least two batteries 20 to establish both physical and thermal contact between the at least two batteries 20.

Figure 2:
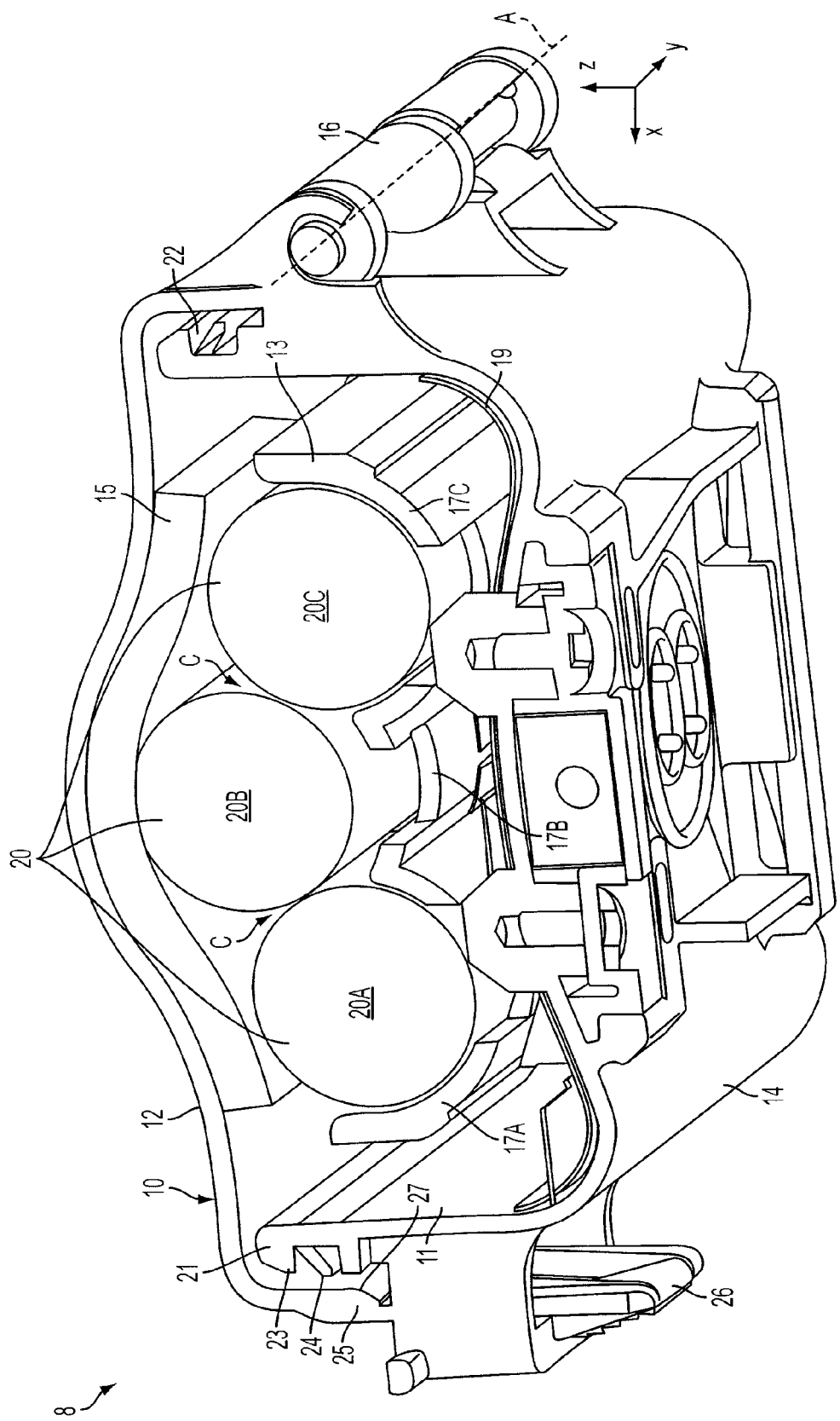
FIG. 2 depicts a cross-sectional view of the battery pack of FIG. 1 that is populated with batteries and illustrated in a closed position.

Referring now to FIGS. 1 and 2, FIG. 1 depicts a perspective view of an empty battery pack 8 that is shown rotated to an open position, according to one exemplary embodiment of the invention. FIG. 2 depicts a cross-sectional view of the battery pack 8 of FIG. 1 that is populated with alkaline batteries 20A-20C (referred to collectively as batteries 20) and illustrated in a closed position. By way of non-limiting example, the battery pack described herein, or modified versions thereof, may be used in a helmet mounted night vision system or any other electronic device.

Battery pack 8 includes an enclosure 10 that generally includes a top cover 12 that is pivotably coupled to a bottom cover 14 along an axis of rotation 'A' by hinges 16. Top cover 12 pivots between an open position (FIG. 1) and a closed position (FIG. 2). In the closed position of cover 12, the covers of enclosure 10 define a closed battery compartment 11.

Top cover 12 includes a top wall and a sidewall 25 that extends across its entire perimeter. The walls of cover 12 define an open-ended interior region. Sidewall 25 of cover 12 includes a sealing surface 27 that is positionable against seal 24 in the closed position of enclosure 10 such that seal 24 is compressed against sealing surface 27. The perimeter of top cover 12 is substantially rectangular, but may be any desired shape. Top cover 12 conceals the battery compartment 11 of bottom cover 14 when it is rotated to a closed position (see FIG. 2).

Bottom cover 14 includes a top wall and a sidewall 21 that extends across its perimeter. The walls of cover 14 define an open-ended interior region. The open interior region of bottom cover 14 defines an open-ended battery compartment 11 for storing one or more batteries. The perimeter of bottom cover 14 is substantially rectangular, but may be any desired shape which compliments the shape of top cover 12.

Sidewall 21 of cover 14 defines a sealing surface 23 that is engaged with seal 24. A pre-determined gap is defined between sealing surface 23 of bottom cover 14 and sealing surface 27 of top cover 12. Elastomeric radial seal 24 is positioned between sealing surfaces 23 and 27 to prevent the escape of thermal energy in the form of heat from the closed battery compartment 11 of enclosure 10 as well as to prevent the introduction of fluid or other contaminants into the battery compartment 11 of enclosure 10.

A gland 22, in the form of a rectangular slot, is defined around the circumference of the outwardly-facing sealing surface 23 of sidewall 21. Radial seal 24 is mounted in gland 22. When cover 12 is rotated to a closed position, radial seal 24 is compressed in a downward direction (as shown) to prevent the escape of thermal energy in the form of heat from the sealed interior of enclosure 10 and the introduction of fluid or other contaminants into the sealed interior of enclosure 10.

A flexible locking tab 26 extends from sidewall 25 of top cover 12. Flexible locking tab 26 is configured for releasably mating with a rectangular slot 28 that is defined on side wall 21 of bottom cover 14. Positive engagement between locking tab 26 and slot 28 locks covers 12 and 14 together. Additionally, upon engaging tab 26 with slot 28, as shown in FIG. 2, seal 24 is compressed against sealing surface 27 of top cover 12 and an insulative sheet 15 of top cover 12 applies a downward force against the cylindrical surface of battery 20B. Locking tab 26 can be released from slot 38 by translating the free end of locking tab 26 toward sidewall 21 of bottom cover 14 and rotating either one of covers 12 and 14 to an open position.

Insulative sheet 15 is mounted to a top interior surface of top cover 12. In a closed position of enclosure 10, as shown in FIG. 2, insulative sheet 15 applies a downward force to battery 20B, which causes the cylindrical surface of battery 20B to bear on the cylindrical surfaces of batteries 20A and 20C. The cylindrical exterior surface of battery 20B makes a line contact 'C' along its length dimension with the cylindrical exterior surfaces of adjacent batteries 20A and 20C such that thermal energy may be conducted between the batteries via the line contacts 'C'. The thickness dimension of sheet 15 is tailored to establish the physical line contact 'C' among the batteries 20 while permitting tab 26 to lock in slot 28. According to another exemplary embodiment that is not disclosed herein, insulative sheet 15 is omitted and cover 12 bears directly on the cylindrical surface of battery 20B to achieve a similar result.

Terminal plate 13 is mounted within bottom cover 14. Terminal plate 13 establishes an electrical connection with the terminals of batteries 20. The battery terminals are electrically connected in series or parallel with one another by terminal plate 13. Terminal plate includes semi-cylindrical recesses 17A-17C, which are each sized for retaining a single battery 20. Unlike conventional terminal plates, semi-cylindrical recesses 17A-17C of terminal plate 13 are designed to establish a physical line contact 'C' between batteries 20, as shown in FIG. 2. Semi-cylindrical recess 17B is positioned at an elevation that is closer to top cover 12 as compared to the elevation of semi-cylindrical recesses 17A and 17C, such that sheet 15 bears on battery 20B and battery 20B bears on batteries 20A and 20C. Semi-cylindrical recesses 17A and 17C are optionally positioned at the same elevation within enclosure 10.

It should be understood that batteries 20 may be of any particular size, type, style or shape and are not limited to that shown. It follows that the size and shape and configuration of semi-cylindrical recesses 17A-17C may vary from that shown and described to accommodate batteries of different sizes and shapes.

An insulation sheet 19 is mounted to bottom cover 14 and is positioned beneath terminal plate 13 to insulate the bottom end of enclosure 10 and, consequently, inhibit the transfer of thermal energy out of battery compartment 11 of enclosure 10. As described hereinafter, retaining thermal energy within battery compartment 11 of enclosure 10 increases the temperature of batteries 20, which improves their life span at cold temperatures.

Batteries 20 generate joule heat and reaction heat through a chemical reaction that accompanies discharging. The greater the electrical capacity, the more thermal energy is generated, and since battery 20 is sealed, the radiation of heat to outside battery 20 is slowed and thermal energy in the form of heat accumulates inside of battery 20. By maintaining batteries 20 in both physical and thermal contact, heat that is produced by batteries 20 is not radiated outside of the battery pack and, instead, is conducted to adjacent batteries 20, thereby raising the temperature of all batteries 20.

Maintaining batteries 20 at a higher temperature increases their life span at cold temperatures, such as −20 degrees Celsius, for example. In contrast, in conventional battery packs, batteries within the battery packs are not positioned in direct physical contact, such that, in operation, the heat generated by one battery is not conducted to adjacent batteries and the heat produced by the batteries quickly radiates through the battery compartment.

In addition to the foregoing thermal management features of battery pack 8, battery pack 8 includes the following additional thermal insulation provisions, namely: uniform sealing properties of enclosure 10 and an insulative sheet (not shown) that is applied over the batteries.

With regard to the uniform sealing properties of battery pack 8, enclosure 10 includes two hinges 16 that are configured to accommodate translation of top cover 12 with respect to bottom cover 14 (or vice versa) in the X and Y directions. In other words, hinges 16 accommodate transverse shifting of an axis of rotation 'A' of enclosure 10 along the X axis, as well as axial shifting of top cover 12 along the axis of rotation 'A' (i.e., along the Y axis) as seal 24 is being compressed. The hinge design takes advantage of the forces applied by seal 24, as it is compressed by top cover 12, to center top cover 12 onto bottom cover 14. In other words, seal 24 induces translation of top cover 12 in the X and Y directions such that a substantially uniform compressive force is applied along the length of seal 24. A more uniform seal assists in retaining heat that is generated by batteries 20 within the enclosed interior region of enclosure 10. Further details of the uniform sealing properties of enclosure 10 are described in U.S. patent application Ser. No. 12/887,892 to John Sadler et al., which is incorporated by reference herein in its entirety for all purposes.

With regard to the insulative sheet (not shown) that is applied over the batteries, the sheet is wrapped around batteries 20 to insulate those batteries 20. The sheet may be composed of one or more of the following materials: aluminum tape, open cell polyurethane foam, and/or Styrofoam. Insulating batteries 20 increases the temperature of batteries 20, which improves their life span at cold temperatures.

Referring now to the materials of enclosure 10, covers 12 and 14 are injection-molded plastic components. Terminal plate 13 is composed of sheet-metal. Insulative sheet 15 is composed of an insulative material, such as Styrofoam, for example. Insulation sheet 19 is composed of 0.006 inch thick flame retardant polypropylene. It should be understood that the individual components of enclosure 10 may be composed of any material and made by any forming process known to those skilled in the art without departing from the scope of the invention.

Although the invention is illustrated and described herein with reference to specific embodiments, the invention is not intended to be limited to the details shown. Rather, various modifications may be made in the details within the scope and range of equivalents of the claims and without departing from the spirit of the invention.

For example, the battery pack is not limited to a modular design and the components of the battery pack may be integrated directly into an electronic device without departing from the scope or spirit of the invention. In such an example, terminal plate 13 is positioned within a battery compartment of an electronic device and top cover 12 is releasably mounted to the electronic device to conceal the battery compartment and bear on the batteries that are positioned within the battery compartment of the electronic device. Additionally, batteries 20 may be of any particular size, type, style or shape and are not limited to that shown.

What is claimed:

1. A battery pack comprising:
   a battery compartment for enhanced operation in a cold environment;
   a terminal plate positioned within the battery compartment for retaining at least two batteries within the battery compartment; and
   a cover for enclosing the battery compartment, wherein, upon enclosing the battery compartment with the cover, the cover is configured to urge an exterior surface of one of the at least two batteries against an exterior surface of another of the at least two batteries to establish both physical and thermal contact between the at least two batteries,
   wherein the cover includes a resilient sheet mounted to the cover, wherein, upon enclosing the battery compartment with the cover, the sheet of the cover is positioned to urge an exterior surface of one of the at least two batteries against an exterior surface of another of the at least two batteries.

2. The battery pack of claim 1 further comprising at least two batteries.

3. The battery pack of claim 1, wherein the sheet is composed of a thermally insulative material.

4. The battery pack of claim 1, wherein the sheet is positioned to contact an exterior surface of one of the at least two batteries.

5. The battery pack of claim 1 further comprising a thermally insulative sheet positioned between the battery compartment and the terminal plate.

6. The battery pack of claim 1 further comprising a second cover that is pivotably mounted to the cover by a hinge, wherein the cover pivots between an open position and a closed position with respect to the second cover, and the battery compartment is enclosed in the closed position of the cover.

7. The battery pack of claim 6 further comprising an elastomeric seal positioned between the covers to retain thermal energy that is produced by the batteries within the battery compartment of the battery pack.

8. The battery pack of claim 7, wherein the hinge permits limited translational movement of one cover with respect to the other cover to achieve uniform compression of the seal along a length of the seal.

9. The battery pack of claim 7, wherein the hinge permits limited translational movement of one cover with respect to the other along two different axes of the battery pack.

10. The battery pack of claim 1, wherein the terminal plate defines a at least two semi-circular recesses that are each sized to receive a battery therein.

11. The battery pack of claim 1, wherein the terminal plate defines at least three semi-circular recesses that are each sized to receive a battery therein, wherein one of the semi-circular recesses is positioned at a different elevation with respect to the cover than the other semi-circular recesses.

12. A battery pack comprising:
    a battery compartment for enhanced operation in a cold environment;
    at least two batteries contained within the battery compartment;
    a terminal plate positioned within the battery compartment for retaining the at least two batteries within the battery compartment; and
    a cover for enclosing the battery compartment, wherein, upon enclosing the battery compartment with the cover, the cover is configured to urge an exterior surface of one of the at least two batteries against an exterior surface of another of the at least two batteries to establish both physical and thermal contact between the at least two batteries,
    wherein the cover includes a resilient sheet mounted to the cover, wherein, upon enclosing the battery compartment with the cover, the sheet of the cover is positioned to urge an exterior surface of one of the at least two batteries against an exterior surface of another of the at least two batteries.

13. The battery pack of claim 12 further comprising a second cover that is pivotably mounted to the cover by a hinge, wherein the cover pivots between an open position and a closed position with respect to the second cover, and the battery compartment is enclosed in the closed position of the cover.

14. The battery pack of claim 13 further comprising an elastomeric seal positioned between the covers to retain thermal energy that is produced by the batteries within the battery compartment of the battery pack.

15. The battery pack of claim 14, wherein the hinge permits limited translational movement of one cover with respect to the other to achieve uniform compression of the seal along a length of the seal.

16. The battery pack of claim 14, wherein the hinge permits limited translational movement of one cover with respect to the other along two different axes of the battery pack.

17. The battery pack of claim 12, wherein the terminal plate defines at least two semi-circular recesses that are each sized to receive a battery therein.

18. The battery pack of claim 12, wherein the terminal plate defines at least three semi-circular recesses that are each sized to receive a battery therein, wherein one of the semi-circular recesses is positioned at a different elevation with respect to the cover than the other semi-circular recesses.

* * * * *